(No Model.)

M. J. CHENEY & H. BERCH.
CULTIVATOR TOOTH.

No. 482,226. Patented Sept. 6, 1892.

United States Patent Office.

MALVIN J. CHENEY AND HERMAN BERCH, OF TAYLOR, IOWA.

CULTIVATOR-TOOTH.

SPECIFICATION forming part of Letters Patent No. 482,226, dated September 6, 1892.

Application filed April 27, 1892. Serial No. 430,820. (No model.)

*To all whom it may concern:*

Be it known that we, MALVIN J. CHENEY and HERMAN BERCH, of Taylor, in the county of Pottawattamie and State of Iowa, have invented certain new and useful Improvements in Cultivator-Teeth; and we do hereby declare the following to be a full, clear, and exact description of the invention, such as will enable others skilled in the art to which it appertains to make and use the same.

This invention relates to certain new and useful improvements in cultivator-teeth, and has for its object the production of a cheap, simple, and highly-efficient tooth for use in cultivating small farm products, whereby the soil will be thoroughly separated and thrown to one side.

A further object is to provide a cultivator-tooth which can be readily adjusted and one that is applicable to different cultivators The invention consists in a cultivator-tooth having a point of approximately diamond shape and having a cutting arm or wing projecting from one side and bent or curved over the face of the tooth to a point near the opposite side thereof, whereby the soil will be cut by said arm or wing and will be thrown to one side of the tooth and fall partly behind the same, substantially as hereinafter fully set forth, and particularly pointed out in the claims.

Figure 1:
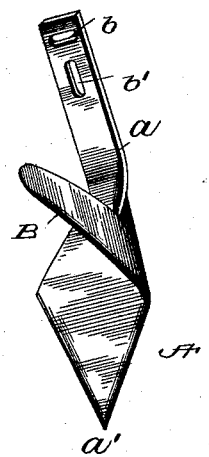
Figure 2:
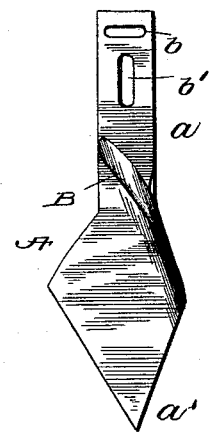
Figure 3:
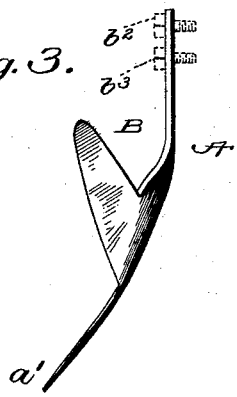
Figure 4:
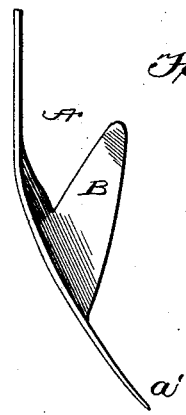

In the accompanying drawings, Figure 1 is a view in perspective of our improved cultivator-tooth. Fig. 2 is a front view thereof; and Figs. 3 and 4 are opposite side views.

Referring to the drawings, A designates our improved tooth, *a* the rectangular shank thereof, and *a'* the point, which is of approximately diamond shape. In shank *a* is formed a transverse slot *b*, and beneath the latter at right angles thereto is a longitudinal slot *b'*. By means of set-screws $b^2$ $b^3$ projected through these slots the tooth can be adjusted and held at any desired angle or pitch. One side of the tooth is provided with an arm or wing B, which is integral with said tooth. This arm or wing is formed by slightly bending one side of the tooth inwardly and curving the elevated portion backward and over until its extreme outer end is on a line with the opposite side of the tooth-shank. The forward or outer edge of this arm from its widened base to its outer reduced end is sharpened, so as to present a knife-like edge to the soil. This arm extends with the tooth down into the soil and in plowing cuts the latter, and by reason of its bend or curvature directs the soil to the opposite side of the shank, so that it will fall partly behind or in rear of the shovel or tooth proper.

In cultivating small plants the knife-arm is made to run next to the plants, and when desired the soil can be turned to the plants by reversing or changing the right and left hand teeth so as to place the knife-arms on the outside.

We are aware that it is not new to provide cultivator-teeth with lateral wings at a point above the cutting portion of the tooth, serving as shields to prevent clods, stones, and the like from falling on the plants, but our improved tooth differs therefrom in many particulars and possesses many advantages thereover. In our tooth the arm or wing penetrates the soil and after cutting the same serves to guide it to one side of the tooth. Another advantage of our cultivator-tooth is that it can be adjusted and held at any desired angle or pitch.

A tooth formed as described will permit a cultivator to run lighter for teams and permit of the easy handling thereof.

We claim as our invention—

1. The herein-described improved cultivator-tooth having an approximately diamond-shaped point and an arm or wing extending from one side and bent or curved over said point to near a line with the opposite side of the tooth-shank and having a forward sharpened edge, as set forth.

2. The herein-described improved cultivator-tooth, having a shank provided with right-angular slots in the outer end, a diamond-shaped point, and a curved arm or wing extending from one side of said point upward and across its face, and having a forward sharpened edge, as set forth.

In testimony whereof we have signed this specification in the presence of two subscribing witnesses.

MALVIN J. CHENEY.
HERMAN BERCH.

Witnesses:
WILLIAM CASSON,
L. T. ELDRIDGE.